US008671065B2

(12) United States Patent
Cole et al.

(10) Patent No.: US 8,671,065 B2
(45) Date of Patent: Mar. 11, 2014

(54) METHODS AND APPARATUS OF MONITORING AN EVOLVING SYSTEM USING SELECTED FUNCTIONAL NEST

(75) Inventors: Ivan Stuart Cole, Melbourne (AU); David Alan Paterson, Melbourne (AU)

(73) Assignees: Commonwealth Scientific and Industrial Research Organisation, Campbell (AU); The Boeing Company, Seattle, WA (US)

( * ) Notice: Subject to any disclaimer, the term of this patent is extended or adjusted under 35 U.S.C. 154(b) by 1013 days.

(21) Appl. No.: 12/451,757

(22) PCT Filed: May 29, 2008

(86) PCT No.: PCT/AU2008/000754
§ 371 (c)(1),
(2), (4) Date: Mar. 4, 2010

(87) PCT Pub. No.: WO2008/144821
PCT Pub. Date: Dec. 4, 2008

(65) Prior Publication Data
US 2010/0169251 A1 Jul. 1, 2010

(30) Foreign Application Priority Data
May 29, 2007 (AU) .............................. 2007902868

(51) Int. Cl.
*G06N 3/00* (2006.01)
(52) U.S. Cl.
USPC .............................................. 706/13; 700/12
(58) Field of Classification Search
USPC .............................................. 706/13; 700/12
See application file for complete search history.

(56) References Cited

U.S. PATENT DOCUMENTS

| 6,292,810 | B1 | 9/2001 | Richards |
| 6,636,842 | B1 | 10/2003 | Zambrano et al. |
| 6,865,509 | B1 * | 3/2005 | Hsiung et al. ................. 702/182 |
| 6,934,931 | B2 | 8/2005 | Plumer et al. |
| 7,065,511 | B2 * | 6/2006 | Zhao et al. ....................... 706/21 |
| 7,216,061 | B2 | 5/2007 | Yuan et al. |
| 7,600,007 | B1 * | 10/2009 | Lewis ........................... 709/223 |
| 2005/0004833 | A1 * | 1/2005 | McRae et al. .................... 705/11 |
| 2005/0118612 | A1 * | 6/2005 | Bonabeau et al. ................. 435/6 |
| 2006/0009864 | A1 * | 1/2006 | Kranner ........................... 700/28 |
| 2007/0220340 | A1 | 9/2007 | Whisnant et al. |

FOREIGN PATENT DOCUMENTS

JP 2005-267363 9/2005

OTHER PUBLICATIONS

International Search Report for PCT/AU2008/000754 dated Jul. 21, 2008.
Supplementary European Search Report and Search Opinion issued in a corresponding European Patent Application No. EP 08 74 8015 on Sep. 8, 2011.
English translation of Notice of Reasons for Rejection issued in a corresponding Japanese Patent Application No. 2010-509624 on Aug. 7, 2012.

* cited by examiner

*Primary Examiner* — Kakali Chaki
*Assistant Examiner* — Mai T Tran
(74) *Attorney, Agent, or Firm* — Nixon & Vanderhye P.C.

(57) ABSTRACT

A method of monitoring an evolving system, the method including the steps of: obtaining a plurality of sensor data streams relating to outputs from sensors monitoring said system, wherein at least one of said sensors monitors a condition of said system, and wherein at least one of said sensors monitors a causal agent for said condition; iteratively constructing a plurality of functional nests, each functional nest being a functional formed from a combination of selected functionals from a basic set of functionals; determining an output data stream for each functional nest by inputting said sensor data streams into said functional nests; selecting a functional nest from said plurality of functional nests based on said output data streams; and using said selected functional nest to monitor said system.

31 Claims, 3 Drawing Sheets

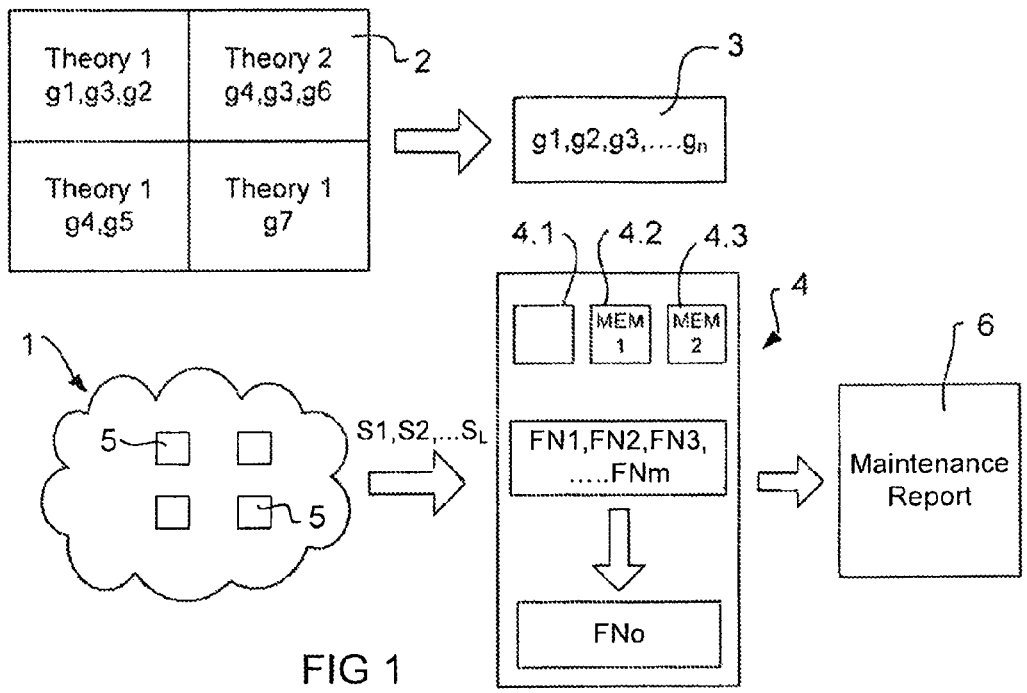
FIG 1
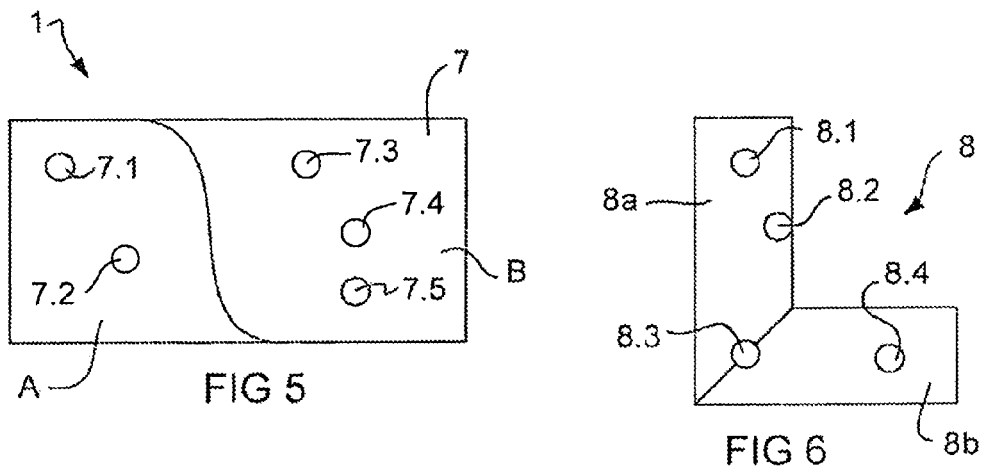
FIG 5
FIG 6
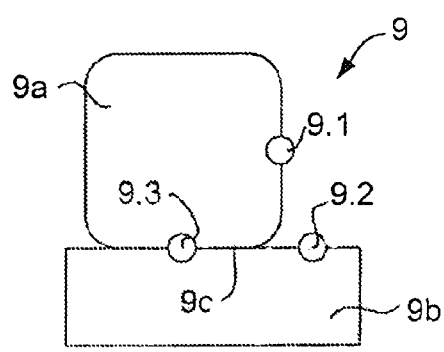
FIG 7
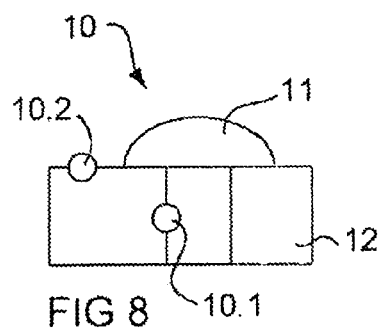
FIG 8

METHODS AND APPARATUS OF MONITORING AN EVOLVING SYSTEM USING SELECTED FUNCTIONAL NEST

This application is the U.S. national phase of International Application No. PCT/AU2008/000754 filed 29 May 2008 which designated the U.S. and claims priority to Australian Patent Application No. 2007902868 filed 29 May 2007, the entire contents of each of which are hereby incorporated by reference.

The present invention relates to methods and apparatus for monitoring the state of an evolving system.

There are many situations in which is it desirable to monitor the state of an evolving system and to provide diagnostic and prognostic services relating to the system as the system evolves over time. Such situations include for example the monitoring of a structure, e.g. a building or a vehicle, and/or the monitoring of a process, e.g. an industrial or environmental process. The results may be used to assess system performance, and may facilitate maintenance of the system and early intervention to improve performance, stability, prevent failure or to take some other pre-emptive or remedial action.

There are basically two known ways to monitor an evolving system: An 'a-priori'-based process model or a statistical analysis of the evolution.

In the 'a-priori'-based approach, mechanisms underlying a system, such as physical and/or chemical processes, are investigated, understood and modelled accordingly. Starting parameters are input into the model and the model is run to show how the system will evolve over time from the initial conditions.

A problem with the 'a-priori'-based approach is that underlying processes are not always known or well characterised and may often change over time.

In the statistical-based approach, time-dependent data from a system is analysed to determine statistically-significant patterns. Such an approach does not require an understanding of underlying system mechanisms, but the results must be treated with care and are often only valid under limited conditions.

There currently exists a need to provide new approaches to the monitoring of an evolving system, which may facilitate diagnosis and/or prognosis of the system.

One aspect of the present invention provides a method of monitoring an evolving system, the method including the steps of:

obtaining a plurality of sensor data streams relating to outputs from sensors monitoring the system, wherein at least one of the sensors monitors a condition of the system, and wherein at least one of the sensors monitors a causal agent for the condition;

iteratively constructing a plurality of functional nests, each functional nest being a functional formed from a combination of selected functionals from a basic set of functionals;

determining an output data stream for each functional nest by inputting the sensor data streams into the functional nests;

selecting a functional nest from the plurality of functional nests based on the output data streams; and using the selected functional nest to monitor the system.

A functional is defined as a function of a function and as a function over a vector space. The input vector space is one or more time-coded streams of data, and the output vector space is a single time-coded stream of data. In this case, the input data streams will be the values over time for causal agents of a condition or state of the system that is to be monitored, as monitored by the system sensors, and the output will be the evolution of the system condition or state over time.

Functionals include, but are not limited to, all solutions of ordinary differential equations. A functional of a functional is a functional. A nest of functionals is any combination of functionals from the basic set that is itself a functional.

A method including the above-described steps enables selects an optimal combination of functionals (an optimal functional nest) that best represents how the system responds to various sensed parameters (causal agents) over time. For example, the system could relate to the corrosion of a physical structure, the sensor data streams could be values for the causal agents of corrosion at one or more locations, e.g. wetness values, pH values and the like, and the output data stream could be a measure of how close the structure is to failure.

The use of functionals can combine the best aspects of 'a-priori'-based and statistical-based modelling, as process knowledge will be embedded in the forms of the functionals in the basic set and in how they are combined, but the selection of the best combination of functionals (and the underlying processes which they will reflect) is sensor driven, so that the relationship represented by the selected combination of functionals is a direct response to the conditions actually existing in the system.

The method can be seen as partitioning theories potentially relevant to a system's evolution into a set of modules (represented by the functionals) and as using sensed system data to reassemble these modules into a workable system model (the selected functional nest). This model can then be used for diagnosis and/or prognosis of the system.

The functionals that are to be combined may take many different forms, and the basic set of functionals from which the functional combinations are formed may vary between systems and between conditions being monitored so as to reflect the underlying mechanisms that may be expected to occur in the systems and to be relevant to the monitored conditions. The basic set of functionals may be constructed by dissecting theories relating to the behaviour of the system into individual functionals, and the method may reassemble these functionals into a new theory for the overall system.

The selection of the functional nests will generally be driven by an optimization of its output to the condition being monitored. The causal agent data streams are input into the various possible functionals nests, and functional nests are chosen whose output data streams have the best fit to the data streams for the monitored condition. The functional nests may be selected by a multidimensional optimization of their coefficients.

The functionals may be linked to specific data streams, e.g. specific sensors, but preferably, the data streams may be applied to any of the functionals. In this case, the functional nests will be constructed from a combination of selected functionals and from a combination of selected sensor data streams.

Functionals may have none, one or more than one coefficient and operate on one or more data streams. It may be useful to limit functionals in the basic set to those that have either one coefficient and one data stream or no coefficient and two data streams, as this may provide for programming simplicity. It is also preferred that at least one functional operate on more than one data stream, as this allows for the coupling together of results from separate sensors, e.g. temperature and moisture in a corrosion monitoring system.

Preferably, functionals in the basic set have different types of nonlinearity. This may provide for good numerical performance, and may avoid duplication and cover a large range of possible theories. Typical nonlinearities may include exponentiation, integration, thresholding, multiplying sensor data streams, interpolation, quantization, application of a pre-specified function, and time-lagging or phase shift using a differential equation. Positive coefficients may be enforced where desired by squaring them, e.g. so as to prevent numerical problems caused by dividing by a number that is crossing zero and causing instability in convergence of the numerical algorithm.

The more distinct the functionals are from one another, the quicker a computer may distinguish between them.

A number of different functional nests may be stored, e.g. held in processor memory, at the same time and the coefficients for each functional nest may be optimized using sensor data over a specific time period prior to selecting the functional nest that is to be used for monitoring.

The selected functional nests, e.g. held in processor memory, may be updated over time, e.g. after each new value for a data stream or after a set amount of new data has been received. Although it would be possible to consider all possible functional nests on each update, this may require significant computing power. To reduce this requirement, a first set of best-fit functional nests may be determined from all possible nests, and the optimal functional nest may then be chosen from this set. This set of best-fit functional nests may be updated frequently, when new data comes in, by optimizing the nest coefficients to the new data, and a new optimal functional nest may be continually chosen from this best-fit set. The best-fit set of functional nests held in processor memory may be updated less regularly, by searching again through all possible functional nests.

The functionals may be combined into the functional nests in any suitable manner. A discrete optimization method suitable for solving NP-hard (Nondeterministic Polynomial-time hard) problems may be used so as to keep the number of functional nests to a manageable level whilst also providing functional nests that can accurately model the monitored systems. A branch and bound method may be used. For example, the method may form all possible functional pairs, e.g. using all possible combinations of functionals and all possible combinations of data streams, and may optimize these for the functional coefficients using multidimensional unconstrained optimization. Each basic functional may then be combined with each functional pair in all possible combinations, e.g. at each level of nesting, and all of the resulting nests may then be optimized for their coefficients. Both the functional pairs and functional triples thus formed may then be ordered for best-fit, and the number of functional nests reduced to a maximum number by discarding the worst-fitting nests. This process may then be repeated, by adding a further functional to each triple, etc., until a desired level of nesting has been reached or until some other criteria has been met, e.g. a high degree of fit. The resulting set of functional nests can then be used as the basis for choosing an optimal functional nest, or a limited number of the best-fitting of them may be used.

In order to further improve the processing time, rules may be provided for combining functionals, so that various inappropriate combinations do not occur. For example, if combinations of functionals are equivalent to one another, only one of the combinations may be allowed. Also, combinations of functionals that are numerically difficult to process may be avoided, as may combinations that do not relate to a realistic evolution mechanisms.

Another criterion may be that functional nests are rejected if they provide an output data stream that does not conform to an expected characteristic of the monitored system. For example, if a monitored condition of a system cannot increase or cannot decrease, functional nests which produce outputs that do increase or decrease respectively may be rejected, e.g. prior to optimization of the nest or a best-fit check of the nest. This could for example prevent the use of functional nests that provide for a reduction in corrosion, as corrosion will only increase or remain constant, and will not spontaneously reduce.

The optimal functional nests provided by the present methods may be used for diagnostics and prognostics purposes. In one form, predicted future data streams for the causal agents are input into the selected optimum functional nest so as to provide an output data stream corresponding to predicted future values of a condition of the system to which the functional nest relates. The predicted future data streams may be based on prior sensed data streams, and may for example relate to a re-running of all data values in a prior sensed data stream. Thus, causal agents of a condition or state of a system will often be consistent, and may for example be constant or cycle in a known manner, and so old data stream values may simply be repeated to determine new data values. It may be also that only a segment of a prior data stream is used, e.g. relating to a significant situation for the system, such as being exposed to a particular environment for the time of the segment. The prior data may also be modified to take account of expected differences in the future data streams, e.g. through an expected change in the environment.

As the selected optimal functional nest of a system reflects its underlying physical response and mechanisms, the nest may be compared to the selected functional nests of other systems, such as similar systems with different locations, geometries, materials or environment, so as to determine how similar the systems are to one another. The comparison may for example involve the number of common functionals in the nests and the similarity in their ordering. It could also relate to time histories of the nests, e.g. how they have changed over time. Thus, functional nest data may be stored over time, and functional nest data for two systems may be compared to determine a correspondence between the systems. The systems could for example relate to locations on a corroding structure.

Similar systems may inform one another in their choice of functional nests. For example, if two systems are similar, and one is in a more advanced state than the other, then functional nests selected for the more advanced system may be used in modelling the less advanced system. For example, a current optimal functional nest of a less advanced system may be interpolated with a current optimal functional nest of a more advanced system so as to produce a functional nest that may better predict the development of the less advanced system at the stage of the more advanced system. Such interpolation may be especially useful when attempting to predict failure or some other state that is not in the immediate future of a system but is at some time later, when the best-fitting functional nest of a system may have changed somewhat from that currently chosen.

The histories of more advanced systems may also be useful in determining rules for the combination of functionals in less advanced systems, as trends in best-fitting or worst-fitting functional combinations may be identified and may then be preferred or avoided in the less advanced system.

The results for monitored systems may also be applied to unmonitored systems. For example, a monitored system, such as a physical structure may include a number of sub-systems, e.g. locations on the structure, that are individually monitored. In such systems, it may not be possible to monitor all sub-systems, either due to cost or practical concerns, such as the location being inaccessible to sensors, e.g. in a crevice of the structure or the like.

In this case, optimal functional nests may be determined for sensed sub-systems, and unsensed sub-systems may be monitored by using the optimal functional nests and sensor data streams from the sensed sub-systems. Thus, sensed and unsensed locations that have similar responses to causal agents, e.g. are similar in structure, e.g. geometry and materials, may be identified so that they may use the same optimal functional nests, whilst sensed and unsensed locations that are identified as having causal agents of similar values (e.g. locations that are adjacent to one another) may utilise the same sensor data streams.

The functional nests and data streams of the sensed sub-systems, e.g. locations, may be modified by a predetermined extrapolation functional so as to take account of expected differences in the nests or data streams between the sensed and unsensed locations. The nest or data streams from two or more sensed systems of similar type may also be interpolated so as to provide a nest or data stream for an unsensed system, e.g. an unsensed location that is intermediate or in the vicinity of two similar sensed locations.

The similarity of two systems, e.g. for interpolation purposes, may require similarity in the optimal functional nests and/or in their known inherent qualities, e.g. geometries and material composition. The similarity of two systems in respect of causal agent data streams may be determined by similarity in environment, e.g. adjacent locations on a structure.

The present invention also extends to apparatus for use in the above-discussed methods. Another aspect of the present invention provides apparatus for monitoring an evolving system including:

a set of sensors for monitoring parameters of the system, one of the sensors monitoring a condition of the system, and one of the sensors monitoring a causal agent for the condition; and processing means for:
receiving data streams from the set of sensors;
interactively constructing a plurality of functional nests, each functional nest being a functional formed from a combination of selected functionals from a basic set of functionals;
applying the functional nests to the data streams to produce an output data stream for each functional nest;
selecting a functional nest based on the output data streams; and
monitoring the system using the selected functional nest.

One of the sensors may monitor a condition or state of the system, and at least one other sensor, but usually more, will monitor causal agents that alter the monitored system state.

For example, for a corrosion monitoring system, causal sensors may include wetness sensors, temperature sensors, RH sensors, salinity sensors, and pH sensors, whilst state sensors may monitor corrosion currents and may include linear polarization resistance sensors, electrochemical resistance sensors, galvanic couples and corrosion product sensors. Some state sensors may also be used as causal sensors.

The sensors may be provided together in a sensor cluster at a particular location in the system, and a plurality of locations may be monitored, with each location having a cluster of sensors. Functional nest data of the cluster locations may be compared with one another in order to determine whether behaviour of the system at the locations is similar, as may inherent features of the system at those locations, e.g. geometry and materials of a structure.

Locations that are not provided with sensors may be monitored by using optimal functional nests and sensor data streams from sensed locations. The data streams may come from sensed locations that are near to the unsensed locations, e.g. that have the same or similar environments, whilst the functional nests may come from near or remote locations, and may depend more on similarities in the inherent features of the system at the locations, e.g. their geometries and materials.

The apparatus may take many forms from general purpose computers to dedicated processing units. The apparatus may be embodied in a central processing unit which receives sensor readings from many different sensed systems or sub-systems, e.g. structural locations. It may also be embodied in a distributed system, with an intelligent processing unit provided at each sensor cluster for processing the sensor data and for providing predictions and the like for that location. These processing units may receive information from other processing units and from a central controller, and the central controller may also receive information from the processing units so as to provide a whole world view and to marry up predictions from different processing units to monitor for any overall problems.

As well as being provided by real sensor systems, the data streams used with the functionals may also or alternatively be formed of synthetic data. Synthetic data may be generated to mimic the outputs of real sensors, and may originate from or be based on real sensor data. It may be used for example for: simulated runs on equipment that has not yet been installed or instrumented; interpolation or extrapolation in space or from one process unit to another; extrapolation in time; sub-sampling, eg. generating data at hourly intervals from daily measurements; and replacing lost or damaged data.

The methods and apparatus may be used in many different applications. For example, they may be used in the monitoring of a structure, e.g. a building or a vehicle, and/or the monitoring of a process, e.g. an industrial or environmental process. The results may be used to assess system performance, and may facilitate maintenance of the system and early intervention to improve performance, stability, prevent failure or to take some other pre-emptive or remedial action.

In one especially useful application, the methods and apparatus may be used in vehicle health monitoring, e.g. in the aerospace industry.

The present invention also extends to software for performing the method of the present invention. Another aspect of the invention provides software for use with apparatus for monitoring an evolving system, the system including a set of sensors for monitoring parameters of said system, one of said sensors monitoring a condition of said system, and one of said sensors monitoring a causal agent for said condition; and processing means, the software including a series of instructions for causing the processing means to:

receive data streams from said set of sensors;
interactively contract a plurality of functional nests, each functional nest being function formed from a combination of selected functionals from a basic set of functionals.
applying said functional nests to said data streams to produce an output data stream for each functional nest;
selecting a functional nest based upon said output data streams; and
monitoring said system using said selected functional nest.

It should be noted that any one of the aspects mentioned above may include any of the features of any of the other aspects mentioned above and may include any of the features of any of the embodiments described below.

Embodiments of the present invention will now be described, by way of example only, with reference to the accompanying drawings. It is to be understood that the particularity of the drawings does not supersede the generality of the preceding description of the invention.

In the drawings:

FIG. 1 is a schematic diagram of a method and apparatus for monitoring an evolving system using a set of functionals;

FIG. 5 is a schematic view of a structure that may be monitored at a number of sensed and unsensed locations using a functional method; and FIGS. 6 to 8 are schematic views of various further structures that may be monitored using a functional method at various sensed and unsensed locations.

Figure 2:
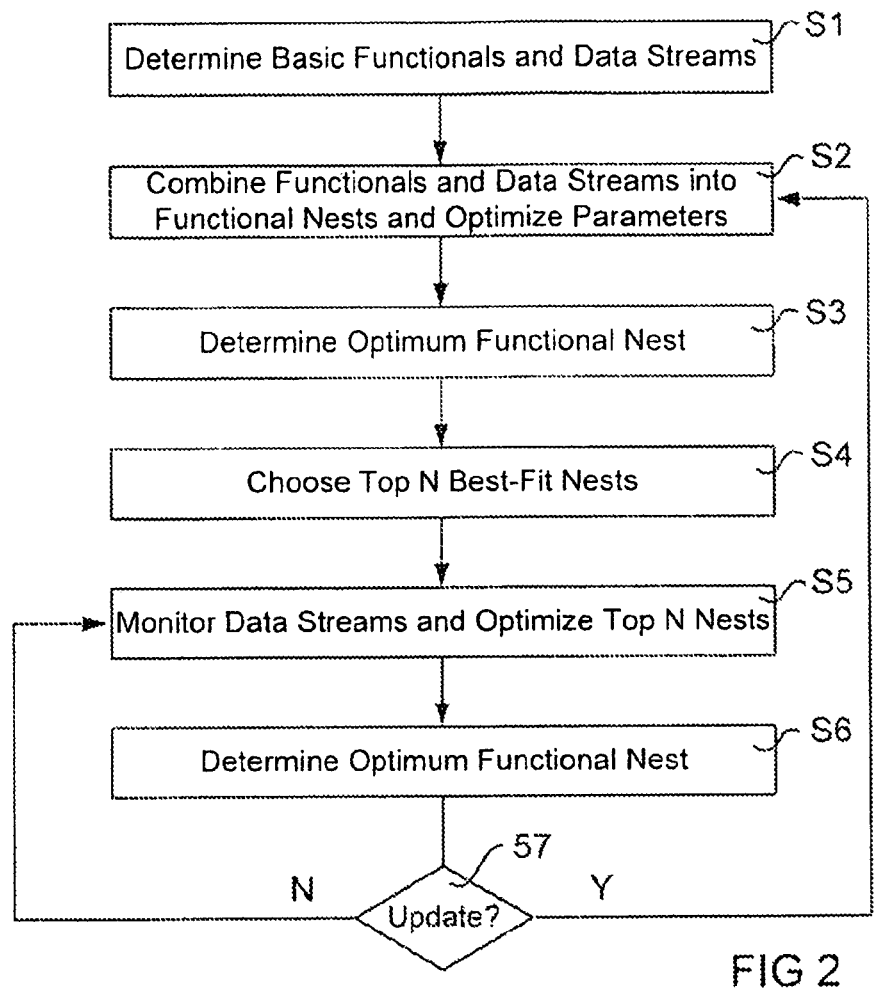
FIG. 2 is a flowchart for a process for determining an optimal functional nest to use in monitoring a system.

Referring to FIG. 1, a system 1 that evolves over time, e.g. a degrading physical structure, is often complex in nature. For example, a number of mechanical, physical and/or chemical processes may be occurring in the system, and it may be difficult to know exactly how these processes work or interact with one another or how they develop over time. Accordingly, it can be difficult to model such systems using conventional modelling techniques.

In the present method, mathematical representations or "theories" 2 are identified that may represent various processes/mechanisms that may be at work in the system 1. These theories 2 are then broken up into individual basic functionals $g_1$ to $g_n$, each of which may be relevant to one or more of the processes or theories 2.

A functional may be thought of as a function of a function, and would act on one or more input time-coded data stream to produce an output time-coded data stream.

These individual basic functionals g.sub.1 to g.sub.n are stored in a memory 3 of a processor 4. The processor 4 includes a data processing unit 4.1, a primary memory 4.2 and a secondary memory 4.3. The primary memory 4.2 stores software in the form of a series of instructions to cause the data processing unit 4.1 to carry out desired functionality, such as that depicted in FIGS. 2 to 4. The secondary memory 4.3 temporarily stores data generated during operation of the system 1 that is required by the processor 4 to carry out that desired functionality. The processor 4 combines the functionals g.sub.i to g.sub.n into various possible permutations FN.sub.1 to FN.sub.m. Each of these permutations is a nest of selected ones of the basic functionals g.sub.i to g.sub.n, and can be thought of as representing a possible mathematical "theory" as to how the system 1 might work, i.e. a relationship between causal agents and a resulting condition that is to be monitored.

The processor 4 uses data streams $s_1$ to $s_j$ from sensors 5 in the system 1 to select one of the functional nests $FN_1$ to $FN_m$ as an optimal functional nest $FN_o$ that best predicts how the system 1 responds to influences monitored by the sensors 5, and uses this optimal functional nest $FN_o$ to diagnose and/or predict how the system 1 will evolve over time.

The processor 4 may for example input expected future sensor data streams into the optimal functional nest $FN_o$, to obtain an output data stream that is related to the expected development of the system 1 over time. The system 1 may then provide a user output 6, e.g. a maintenance report or an alert, that indicates the likely state of the system 1 over time and that may issue warnings and make recommendations regarding maintenance or the like based on the expected development.

In order to determine the optimal functional nest $FN_o$, the processor 4 may receive data streams $s_1$ to $s_j$ that relate to both causal agents and to a resulting system condition. For example, the processor 4 may receive sensor data relating to wetness, pH, humidity and the like, as causal agents, and may receive sensor data relating to material corrosion as a resulting system condition. The processor 4 may then input the various causal agent data streams into the various possible permutations of the functional nests $FN_1$ to $FN_m$, and may determine which functional nest provides an output that best-fits the actual corrosion data stream. This functional nest may then be chosen as the optimal functional nest $FN_o$, and may be used to monitor and predict system development.

As more data is received from the system sensors 5, the processor 4 may update the determination of which functional nest is optimal, and so the optimal functional nest $FN_o$ may change over time in response to changes in the system 1.

As well as permuting the functionals $g_1$ to $g_n$ to provide the functional nests, the processor 4 may also permute the sensor streams $s_1$ to $s_j$. Thus, although the functionals $g_1$ to $g_n$ could be limited in their application to a specific sensor or sensors, so that the choice of a functional also forces the use of a particular data stream or streams, the functionals are preferably free to act on any of the sensed data streams. Thus, a functional nest FN will relate not only to a specific combination of functionals, but also to a specific combination of data streams with those functionals.

Further, as well as optimizing the choice of functionals and sensor data streams, the processor 4 may also optimize the coefficients of the functionals. For example, the coefficients of each functional nest may be optimized with respect to the sensor output associated with the condition that is being monitored before a choice is made as to the optimal functional nest, and when the optimal functional nest has been chosen, its coefficients may continue to be optimized according to new sensor data values.

As the functionals $g_1$ to $g_n$ that are combined together reflect underlying physical or chemical mechanisms generally appropriate to the system 1, the final theory (optimal functional nest $FN_o$) chosen by the method will contain physics and/or chemistry, and as the optimal combination of functionals is driven by actual sensor data, the final nest of functionals chosen is a direct response to the actual situation that exists in the system 1. The final theory $FN_o$ will therefore represent a sensor-driven theory for how the system 1 works, and will be more physically and chemically significant than models that for example are merely provided by a statistically process. The optimal functional nest can also be obtained without having to understand in detail the actual mechanisms at work in the system, and can also be more responsive than an 'a priori' model.

FIG. 2 is a flowchart of one exemplary method carried out by the processor 4 to determine an optimal functional nest $FN_o$.

In step S1, the processor 4 determines the basic set of functionals $g_1$ to $g_n$ and the sensor data streams $s_1$ to $s_j$ that are available for use. These will be based on an expectation of what mechanisms may be at play in the system 1 and on what causal agents and conditions need to be monitored. The functionals may be determined from a dissection of separate functionals from various theories of how the monitored system evolves, and the processor 4 effectively recombines these 'theories' into a possible new 'theory' formed from a combination of various of the functionals.

The choice of functionals may be limited to functionals that accept either one coefficient and one data stream, or that accept no coefficients and two data streams, so as to allow for a small program for implementing the method. For good numerical performance, functionals in the basic set may specify different types of nonlinearity. Typical nonlinearities may include exponentiation, integration, thresholding, multiplying sensor data streams, interpolation, quantization, application of a pre-specified function, and time-lagging or phase shift using a differential equation. Positive coefficients may be enforced where desired by squaring them, so as to reduce the risk of numerical problems. Functionals preferably operate on more than one data streams, so as to couple together results from different sensors.

In step S2, the processor 4 combines the functionals and causal agent data streams into a plurality of functional nests, and optimizes coefficients of the functionals in each nest so that the output data streams from the functional nests provide a best-fit to the output data stream of a state sensor that senses a condition of the system that is to be monitored.

In step S3, the functional nest that provides the best-fit to the state sensor data stream is selected by the processor 4 as the optimal functional nest $FN_o$, and this is then stored for use in predicting future conditions of the system.

The method of best-fit can be by a least squares method, and may include weighting, for example when fitting a time series of predicted and actual monitored values for a system, older values may be given less weight than more recent values. This allows more recent error values to play a larger role in predicting future performance than older values. Also, when the weighting is zero at old enough times, this may help to increase computing speeds and reduce storage requirements. It may also better allow for the tracking of a system state, e.g. corrosion, to cope with sudden changes in the system state, e.g. in corrosion rate. The optimization of coefficients may be made a problem in multidimensional unconstrained optimization that can be solved by standard methods.

The optimal functional nest $FN_o$ could continue to be determined in the above manner as new data values come in from the sensors 5. However, in order to reduce computational times, in step S4, the processor 4 determines the best-fitting N functional nests found in step S2, e.g. the best-fitting 100, and stores them as a basis for determining future optimal functional nests by cycling through steps S5 to S7.

Thus, in step S5, the sensor data streams are monitored and the top N functional nests from step S4 have their coefficients optimized against the updated sensor data. This update may occur for each new piece of data received or after a set number of new data values are received. After each optimization, the best-fitting functional nest of the N functional nests is chosen at step S6 to be the optimal functional nest $FN_o$. In this way, the optimal functional nest $FN_o$ is continually updated as the system 1 evolves.

With the evolution of the system 1 over time, the initial top N functional nests of step S4 may no longer be the best-fitting functional nests, and so, at step S7, the processor 4 may monitor for an update condition, which if it exists causes the process to return to step S1 to re-assess all of the possible functional combinations and to redetermine the top N functional nests. If the update condition does not exist, the process continues cycling through steps S5 and S6.

The update condition may be any suitable trigger that may indicate that a re-assessment of the basic group of functional nests is required. It may for example occur after a set amount of time or after a set amount of new data values have been received. It may also occur by ordering the N basic nests according to their best-fit, and by conducting an update when this ordering changes significantly, e.g. when a number of the best-fitting nests change their position in the order in a significant manner.

The process shown in FIG. 2 therefore reduces the computational requirements of the processor 4, but still provides accurate optimal functional nests.

Figure 3:
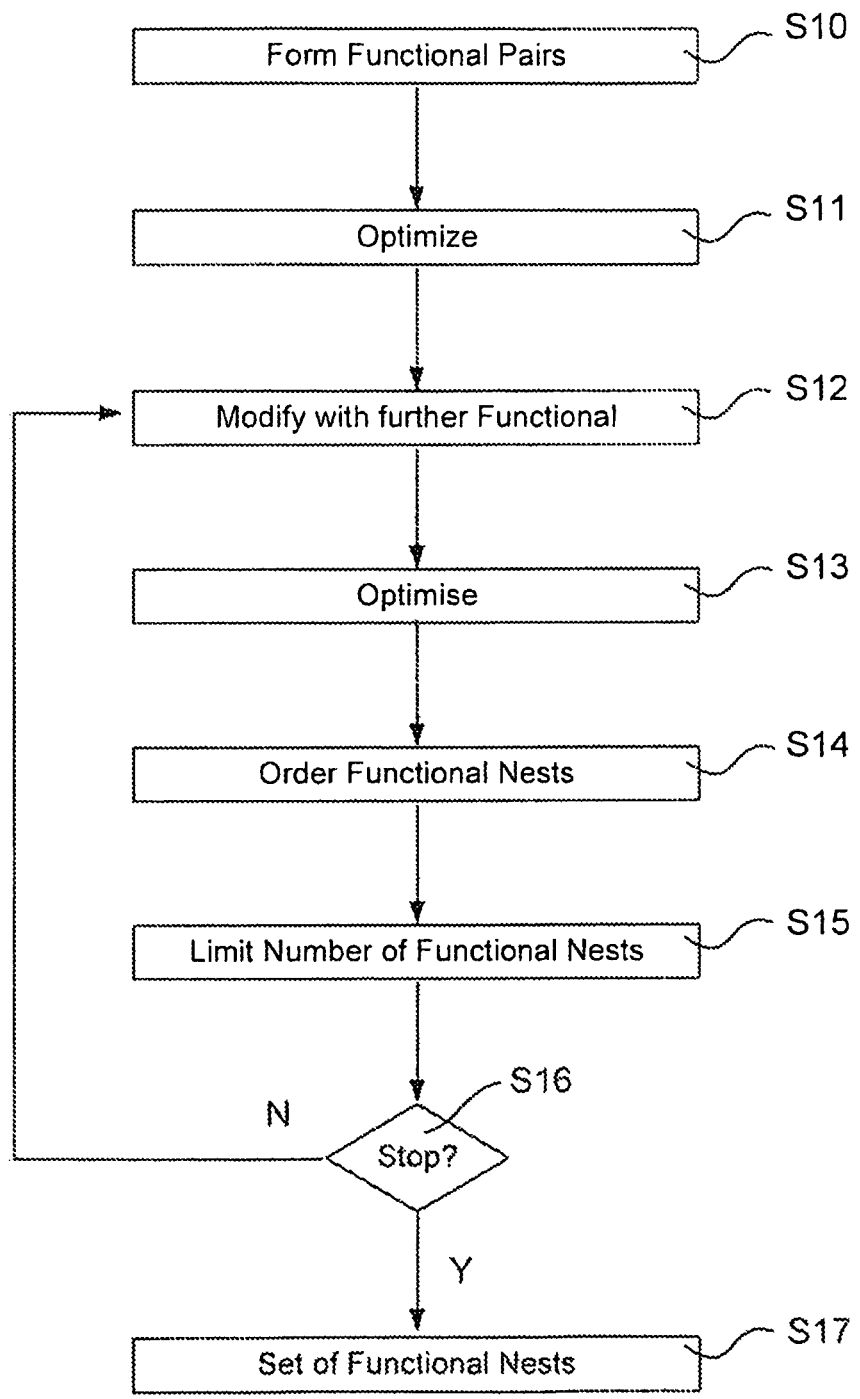
FIG. 3 is a flowchart for a process for determining a set of functional nests from which an optimal functional nest for system monitoring may be chosen.

FIG. 3 is a flowchart for one way of determining the best-fitting functional nests, e.g. for steps S2 to S4 of FIG. 2. It uses a branch and bound searching technique in order to reduce computational overheads.

In step S10, functional pairs are formed from all possible combinations of functionals $g_1$ to $g_n$, and all possible combinations of causal data streams $s_1$ to $s_f$, and these functional pairs have their coefficients optimized in step S11. In step S12, a further one of the basic functionals $g_1$ to $g_n$ is embedded into each functional pair nest, in all appropriate nesting positions, where the appropriateness may be governed by rules that for example limit duplication, and inappropriate system and/or numerical behaviour. The resulting functional nests have their coefficients optimized in step S13. The newly formed optimized functional nests and the nests from which they are formed (which in this first instance of the optimization includes all of the functional pairs) are then ordered in step S14 in accordance with their fit to the data stream from the state sensor, and, at step S15, the functional nests are limited to a maximum number (e.g. 100) by discarding the worst-fitting nests. The ordering and discarding can be combined into a single step. Steps S14 and S15 from FIG. 3 may correspond to steps S3 and S4 from FIG. 2.

The process of steps S12 to S15 is repeated until a stop condition is realized at step S16. Thus, the process continues to add further functionals to each existing nest to build up the depth of the nests, whilst at the same time limiting the number of nests, and thereby saving processing time. After a suitable number of iterations, the addition of functionals is stopped at step S16, and the set of functional nests existing at that time is stored at step S17, e.g. for use in step S4 of FIG. 2.

This set of functional nests may include nests of varying degrees of depth (i.e. numbers of functionals therein), as in Step S14, the functional nests that are ordered include not only the nests that have had a functional added to them, but also those functionals of lower degree that have survived from previous cycles.

The stop condition of step S16 may take any suitable form, and may occur for example when all possible basic functionals $g_1$ to $g_n$ have been embedded, or when the nesting has occurred to a desired maximum depth or when nests are determined to have best-fits closer than a certain value.

Limitations may be placed on how the basic functionals $g_1$-$g_n$ may be combined so as to limit computational needs. For example, combinations of functionals that merely duplicate other functional combinations may be prohibited, as may combinations that would be overly difficult to process numerically or that would not relate to physically meaningful mechanisms.

Also, the output of a functional nest may be compared against an expected or known trend of the system condition being monitored, and may be rejected it its output does not conform to the expected trend. For example, a functional nest may be required to provide a monotonically increasing or decreasing output. This may be appropriate where for example the condition being monitored cannot increase or decrease, e.g. corrosion damage cannot decrease and will only stay the same or increase.

As discussed above, once an optimal functional nest $FR_t$ has been determined, it may be used to predict the future development of the system condition that is being monitored. This may for example be achieved by the process shown in FIG. 4.

Figure 4:
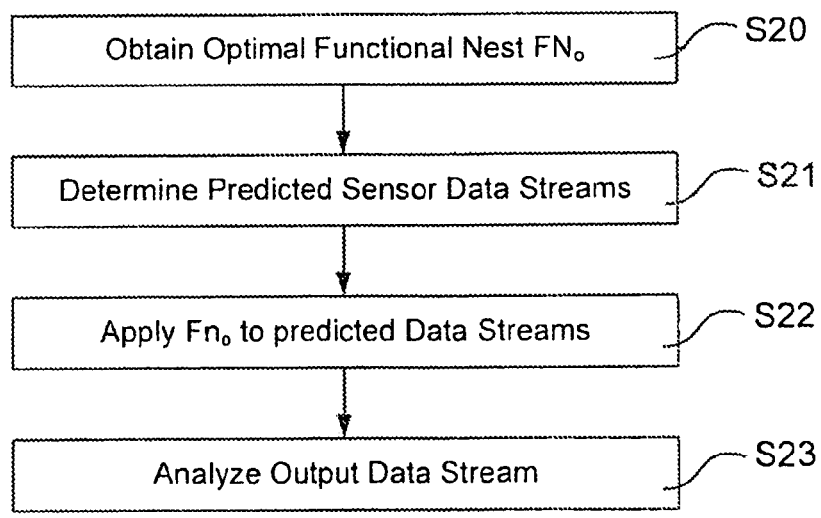
FIG. 4 is a flowchart for a process for predicting a condition of a system using a selected functional nest.

In FIG. 4, the optimal functional nest $FN_o$ for the system is first determined in step S20, e.g. through the processes of FIGS. 2 and 3. Next, a set of future causal agent data streams are determined at step S21. This future causal data may for example be a repeat of previous sensor data, as often causal agent values will have some degree of consistency, and may for example remain generally constant over time or may cycle in an understood manner. The future data could also be identified as a particular part of the prior data stream values, e.g. corresponding to a particular regime that the system has undergone and will again undergo in the future. For example, if corrosion of an aerospace vehicle is being monitored, the data could relate to a particular travel route or the like. Also, the future data could be prior sensor data streams modified in an expected manner, e.g. to reflect known changes in the system environment, such as a monitored structure being moved to a different climate or the like.

Once appropriate data streams have been determined, they are input into the optimal functional nest $FN_o$ in step S22, and the results are analysed in step S23, e.g. to check for a critical condition, such as a failure, or to indicate when a certain amount of damage has occurred and when remedial action may be required. This may then allow for maintenance or the like to be appropriately scheduled, and may allow for pre-emptive actions to prevent a failure or the like.

As the optimal functional nest $FN_o$ reflects underlying processes occurring in the system, it may be used in a number of other manners also. For example, a cross-comparison can be made between optimal functional nest data of one system and of another, e.g. a time history of the selected optimal functional nests, the current optimal functional nests and the like. For example, if the functional nests of the two systems are sufficiently similar, then the systems may be considered to act in a similar manner. This information may be used in a number of ways.

For example, if one system is more advanced, e.g. more degraded, than another, then the time history of the optimal functional nest of the more advanced system may be used to inform the development of the optimal functional nest in the less advanced system. This may be particularly useful for predictions that look further into the future. Thus, although an optimal functional nest determined in accordance with FIGS. 2 and 3 may be a good predictor of the immediate future, it may not remain as relevant in the far future, for example when trying to determine a time of failure of a structure or the like. Accordingly, by identifying similar systems it is possible to use the optimal functional nest data for a more advanced system to better predict the future optimal functional nests of the less advanced system.

For example, the optimal functional nest of a less advanced system may be interpolated with one or more optimal functional nests of a more advanced similar system using an interpolation functional. The resulting optimal functional nest may then be applied to expected future causal agent data streams to predict the development of the less advanced system.

The determination of which location is more advanced may be achieved by comparing the state sensors for the two locations and/or by inspecting their optimal functional nest histories for characteristic trends. Also, in order to determine whether two locations are similar, their inherent features, e.g. geometry and materials, may be compared rather than or as well as their optimal functional nest data.

The history of optimal functional nests for a similar but more advanced system may also be used in rules that define how functionals may be combined, and so may speed up optimization procedures. For example, trends in more advanced systems may be identified, and functional combinations matching those trends may be preferred or avoided in the determination of optimal functional nests for similar systems. For example, it may be found that specific neighbouring functionals occur often in good or bad fitting nests and these may be preferred or avoided respectively.

Whether or not the optimal functional nest data of two systems are similar may be judged in a number of ways. For example, the systems may be considered similar when a set number of the basic functionals in the nests are identical and occur in the same order, and when each of these basic functionals act on data from identical or similar sensors.

Monitored systems may also be used to provide predictions about unmonitored systems. For example, as shown in FIG. 5, a system 1 may relate to the corrosion of a structural element 7, and the monitoring of the system may involve the monitoring of a number of sub-systems, e.g. the corrosion at specific locations 7.1-7.5 in the structural element 7.

This may be achieved by providing causal agent sensors and state sensors at all of the locations 7.1-7.5, and by using the above processes on each location.

It may not however be possible to provide sensors at all locations, and for example sensor clusters may be provided at only some locations, e.g. at 7.1, 7.3 and 7.5. In this case, the above processes may be applied to each of these locations to provide diagnostic and prognostic data regarding each, and the unsensed sites 7.2 and 7.4 may be monitored by using the optimal functional nests and the sensor data from the sensed sites 7.1, 7.3 and 7.5.

For example, it may be known that locations 7.2 and 7.5 will have similar responses to causal agents, e.g. because they are made of the same materials and have the same geometries, whilst it may also be known that location 7.2 is exposed to the same causal agent influences as location 7.1, e.g. because locations 7.1 and 7.2 are in a first environment region A, whilst locations 7.3, 7.4 and 7.5 are in a second environment region B. In this case, predictions for the unsensed location 7.2 may be based on an optimal functional nest determined for location 7.5 and on causal agent data streams obtained from location 7.1.

Instead of using identical optimal functional nests or identical data steams from a sensed location, either may also be modified to take account of expected differences in the optimal functional nest or data streams between the sensed and unsensed locations. This may be achieved by using a predetermined extrapolation function that may for example have been determined from laboratory experiments. This extrapolation functional may be inserted into a predetermined place in the previously determined optimal functional nest.

If may also be possible to use data streams and optimal functional nests from more than one sensed location. For example, if locations 7.3, 7.4 and 7.5 are expected to provide similar system responses to causal agents, then an optimal functional nest for unsensed location 7.4 may be obtained by applying an interpolation functional to the optimal functional nests of sensed locations 7.3 and 7.5. The resulting functional may then also be subjected to an extrapolation functional if differences in locations need to be compensated for.

When considering the appropriateness of an interpolation, a comparison may be made of the optimal functional nests of 7.3 and 7.5 to determine if they are similar. If they are considered similar, for example, if they have a set number of identical basic functionals in the same or a similar order acting on sensors of the same or similar type, then the sensed locations may be considered to have similar responses, and unsensed locations in the vicinity of the two may also be considered to have the same response characteristics. In this case, if locations 7.3 and 7.5 have similar optimal functional nests, both they and location 7.4 may be considered to have similar responses to causal agents, and 7.4 may be assigned an optimal functional nest that is an interpolation of the optimal functional nests of locations 7.3 and 7.5.

Data streams for location 7.4 may also be an interpolation of data streams from locations 7.3 and 7.5, as they are in a similar environment B.

These considerations and interpolations may also be extended to the use of three or more sensed locations.

FIGS. 6 to 8 show further situations in which unsensed locations may be monitored by sensed locations. FIG. 6 is a view of a corner of a structure, FIG. 7 is a cross-section through a crevice, and FIG. 8 is a cross-section through a fastener. In FIG. 6, location 8.3 is a corner of a right-angular structure 8, and so it may not be easy to place sensors in that location, whilst locations 8.1, 8.2 and 8.4 may or may not be sensed. As locations 8.1 and 8.2 are both on a vertical section 8a of the structure 8, their environments may be similar, unless for example water is trickling over location 8.2, whilst the environment at 8.4 may or may not be different because it is on a horizontal section 8b, and the environment at 8.3 will generally be different due to its corner positioning.

In this situation, if there are only sensors at 8.1, then the data streams of 8.1 may be used directly for locations 8.2 and 8.4, whilst these data streams may be modified by a predetermined corner-correction (extrapolation) functional in order to determine data streams for 8.3. The corner-correction functional may be determined beforehand from laboratory experiments and the like.

If there are sensors at 8.1 and 8.4, then the data streams of 8.1 may be used for the data stream of location 8.2, whilst for location 8.3, an interpolation functional may be applied to the data streams of 8.1 and 8.4 and the corner-correction functional may then be applied to the result of the interpolation.

FIG. 7 shows a structure 9 formed from two parts 9a and 9b that form a crevice 9c. In this example, there are locations 9.1 and 9.2 outside of the crevice where sensors may or may not be mounted, and a location 9.3 within the crevice where it would be difficult to mount sensors.

In this example, if only location 9.1 is monitored, then the data streams for location 9.2 may be taken directly from those of location 9.1, whilst the data streams for location 9.3 may be obtained by applying a crevice extrapolation functional to the data streams of location 9.1. This extrapolation functional will again be determined in advance, e.g. in the laboratory, and will be different from the corner extrapolation functional of FIG. 6.

If both locations 9.1 and 9.2 are monitored, then the data streams for 9.3 may be obtained by applying both an interpolation functional and the crevice extrapolation functional to the data streams of locations 9.1 and 9.2.

FIG. 8 shows another type of crevice structure 10, between a fastener 11 and a metal panel 12 that it is bonding. It is usually not possible to place sensors in the crevice location 10.1, but corrosion around the fasteners 11 may be of great concern, and so to monitor this, corrosion at location 10.2 may be monitored, and data streams from 10.2 may be used to determine corrosion at 10.1 by applying another crevice extrapolation functional to it, e.g. as determined in a laboratory.

In FIGS. 6 to 8, the optimal functional nests for the unsensed locations may be determined from sensed locations that are expected to have similar responses to the unsensed locations. These sensed locations may be near to the unsensed locations, e.g. may be one or more of the locations shown in the figures, or could be elsewhere on the structure. Again, the optimal functional nests could be modified by extrapolation functionals and/or interpolation functionals, and will be applied to the above-determined data streams to provide the predicted data streams, e.g. of the expected development of corrosion in the various locations.

Overall, the methods and apparatus of the present invention allow for a complex system that is evolving over time to be modelled by a combination of functionals that provide a good fit to a directly monitored state of a system. The functionals from which the combination is chosen embed real processes and mechanisms within themselves, and the combination is driven by real data. Therefore the resulting combination of functionals will have underlying physical and/or chemical meaning and will be responsive to the particular system under investigation.

The functional combinations that are derived may be used not only to predict future development through their application to predicted future causal agent data streams, but may also provide cross-comparisons between systems, e.g. to determine how similar systems are to one another.

The methods and apparatus may be used in many different applications. For example, they may be used in the monitoring of a structure, e.g. a building, a vehicle, and/or the monitoring of a process, e.g. an industrial or environmental process. The results may be used to assess system performance, and may facilitate maintenance of the system and early intervention to improve performance, stability, prevent failure or to take some other pre-emptive or remedial action. They may for example be used in vehicle health monitoring, for example aerospace vehicle monitoring.

They may be used to monitor any suitable characteristic of the system, e.g. cumulative degradation of a structure, product delivery from a reaction vessel, and distance traveled by a vehicle.

The apparatus may take many different forms, and may include any suitable sensors and data processing apparatus, including suitably programmed general-purpose computers, or dedicated hardware units.

The apparatus may be embodied in a central processing unit which receives sensor readings from many different sensed systems or sub-systems, e.g. structural locations. It may also be embodied in a distributed system, with an intelligent processing unit provided at each sensor cluster for processing the sensor data and for providing predictions and the like for that location. These processing units may receive information from other processing units and from a central computer, and the central computer may also receive information from the processing units so as to provide a whole world view and to marry up predictions from different processing units to monitor for any overall problems.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The present application may be used as a basis for priority in respect of one or more future applications, and the claims of any such future application may be directed to any one feature or combination of features that are described in the present application. Any such future application may include one or more of the following claims, which are given by way of example and are non-limiting with regard to what may be claimed in any future application.

EXAMPLES

Example 1

This is a simple example based on the estimation of the distance traveled by a manual car given the following sensor data:

$s_1$ wheel rpm
$s_2$ engine rpm
$s_3$ gear (i.e. 1 or 2 or 3 etc.)
$s_4$ accelerator pedal position
$s_5$ engine temperature Let the first two unit functionals be:

$$g_1(x)=c_1 x$$

where $c_1$ is a constant to be determined.

$$g_2(x)=\int_0^t x\, dt$$

Theory A says that the distance traveled is $D \approx g_1(g_2(s_1))$.
Let the next two unit functionals be:

$$g_3(x,y)=xy$$

$$g_4(x)=|x|^{c_4}$$

where $c_4$ is a constant to be determined.

Theory B says that the distance traveled is $D \approx g_1(g_2(g_3(s_2, g_4(s_3))))$. Each occurrence of $g_1$ has a different constant.

The distance traveled can also be estimated from sensor $s_4$. Suppose for the purposes of illustration that in Theory C the accelerator pedal position is linearly related to the acceleration and that the only deceleration is due to wheel friction.

Let the next unit functional be the solution of:

$$\frac{dg_5(x)}{dt} = c_5(x - g_5(x)),$$

where $c_5$ is a constant to be determined.

Then Theory C says that the distance traveled is $D \approx g_1(g_2(g_5(s_4)))$.

In this way three theories have been split into five unit functionals.

In the present monitoring methods and apparatus, a computer algorithm may test permutations of these functionals and sensors to find the most accurate combination.

A practical application of a slightly more advanced version of this would be in simultaneously determining the engine friction, wheel friction and aerodynamic drag on a car from a short test drive.

Interpolating functionals may for example be used to estimate values for different versions of the same car. Extrapolating functionals may for example be used when using the results from a passenger car to estimate values for a diesel truck. These functionals need to be defined in advance.

The procedure described is remarkably general. The same five functionals may for example be part of a small suite of functionals used in predicting the corrosion of aluminium from sensors measuring corrosion current, relative humidity, surface wetness and similar.

Example 2

This example relates to the corrosion of a structure.

It is remarkable that all five of the functionals developed for analysing the distance traveled by a manual car can be used without modification for a completely different complex system, the corrosion of a structure.

Let $g_1 \ldots, g_5$ be as defined in Example 1. Then:

A use of $g_1$ is in a change of units, for example from volts measured by a sensor to relative humidity. Other uses are in determining the corrosion in a corner given that on a flat surface, and in relating integrated corrosion to a practical measure of damage such as mass loss or pit depth.

A use of $g_2$ is in determining the time-integrated damage from the instantaneous damage.

A use of $g_3$ is in getting instantaneous damage from wetness times a function of another variable. Another example is in including the effect of pH. There are many other uses.

A use of $g_4$ is in relationships between the wetted perimeter, surface area and volume of a water drop. There are many other uses.

A use of $g_5$ is in surface heating and cooling as a function of air heating and cooling. Another use is in the penetration of aerosols containing electrolyte into a cavity.

For modelling the corrosion of a structure, four more unit functionals may be used that were not used in Example 1.

$$g_6(x,y)=x+y$$

This is used in modelling the heat transfer caused by differential temperatures, in averaging, and in interpolation. There are other ways to do this, for example by using $g(x,y)=cx+(1-c)y$ and/or more advanced interpolation methods.

$$g_7(x)=\max(0,x-c_7)$$

This is used in order to determine the wetness of a surface as a function of the local relative humidity. Another use is in modelling the delay created by the use of a protective layer.

$$g_8(x) = \begin{cases} 1 & \text{if } x > c_8 \\ 0 & \text{if } x \leq c_8 \end{cases}$$

This is used in order to calculate time of wetness as a function of the relative humidity.

$$g_9(x(t)) = \max_{0 \leq dt < c_9}(x(t-dt))$$

This is used in order to get the wetness inside a crack or thin crevice from that outside. There are other ways to do this, for example by using $$\begin{cases} g_9(x(t)) = 1 & \text{if } x(t) > 0 \\ \frac{dg_9(x(t))}{dt} = -c_9 g_9(x(t)) & \text{if } x(t) \leq 0 \end{cases}$$

These nine unit functionals may suffice for modelling corrosion of a structure.

They may fit into three partial theories of corrosion. Let $s_1$ be the sensed relative humidity and $s_2$ be the sensed concentration of aggressive pollutants. Both depend on time.

Theory A: Damage is proportional to time of wetness.

$$D \approx g_1(g_2(g_8(s_1)))$$

Theory B: Damage is proportional to the time of wetness in a crack.

$$D=g_1(g_2(g_8(g_9(g_7(s_1)))))$$

Theory C: Damage is proportional to the deposition of aggressive pollutants.

$$D=g_1(g_2(g_3(g_8(s_1)),s_2))$$

Additional similar theories can be decomposed into unit functionals in similar ways.

Example 3

This example relates to the density of mud at the bottom of a settling tank

This is another totally different complex system. Six of the nine functionals from example 2 may carry across to this example without modification. These are $g_1$ and $g_3$ to $g_7$. Of the others, $g_8$ and $g_9$ are excluded because there is no physical need for them, and $g_2$ is excluded because the density of mud is an instantaneous value and not an integral value, unlike the distance and damage from Examples 1 and 2.

At least one new unit functional is used, the solution of the advection-diffusion equation for given inflow fluid properties and mass flux as a function of time. This can be expressed as:

$$g_{10}(x,y) = \int_{-\infty}^{t} \frac{x}{\sqrt{t}} \exp(-y^2 t/4) dt$$

Other unit functionals can be developed to encapsulate other theories

Example 4

This explains how unit functionals from for example Example 2 might be combined into functional nests.

Each of the unit functionals requires at most one constant. They may be combined in groups to get the correct final form. In groups, they can be fitted to sensor measurements using multidimensional nonlinear least squares curve fitting. This may be done using standard non-linear optimization techniques such as Powell's method.

Different functionals may be used in different ways. For example, functional $g_9$ may be used solely for extrapolation, and not in general nesting combinations, for allowing changes in environment/microclimate, and $g_6$ may be used for both general nesting combinations and for interpolation between different locations and environments.

Certain combinations of functionals may not be appropriate. For example, consider the combined functional $g_i(g_j( \ldots g_k(g_l( \ldots$, constraints may be imposed on k and l for each pair of k and l to limit duplications, avoid impossible numerics, and to be physically realistic. Examples of this might be:

duplications: $g_1(g_2=g_2(g_1)$, so avoid $g_2(g_1)$.

impossible numerics: $g_5(g_5$ could be a perfectly valid part of the mathematical description of corrosion but may not be handled well by a numerical scheme, so avoid $g_5(g_5$.

physically realistic: $g_1(g_4(g_2(g_2$ may be a good fit to the data but may not correspond to any physically realistic mechanism, so avoid $g_2(g_2$.

The following table shows a possible set of limitations, where '1' means permitted and '0' means banned:

|       | k=1 | k=2 | k=3 | k=4 | k=5 | k=6 | k=7 | k=8 |
|-------|-----|-----|-----|-----|-----|-----|-----|-----|
| l=1   | 0   | 0   | 0   | 0   | 0   | 1   | 0   | 0   |
| l=2   | 1   | 0   | 1   | 1   | 1   | 1   | 1   | 0   |
| l=3   | 1   | 1   | 1   | 1   | 1   | 1   | 1   | 1   |
| l=4   | 1   | 1   | 1   | 0   | 1   | 1   | 1   | 0   |
| l=5   | 1   | 1   | 1   | 1   | 0   | 1   | 1   | 1   |
| l=6   | 1   | 1   | 1   | 1   | 1   | 1   | 1   | 1   |
| l=7   | 1   | 1   | 1   | 1   | 1   | 1   | 0   | 0   |
| l=8   | 0   | 1   | 1   | 0   | 0   | 0   | 0   | 0   |

Duplications allowed by the table above should be removed a postieri by checking for matches in the minima from the non-linear least squares fits.

The number of possibilities grows very rapidly with the number of functionals, and non-linear least squares may be slow, so a quicker way of eliminating impossible combinations may be used. One way is to use an approximate monotonicity constraint. Suppose ... $g_i(g_j$ ... has already been accepted, constants $c_i$ and $c_j$ found, and it is required to test ... $g_i(g_k(g_j$ .... Then calculate the value of ... $g_i(g_k(g_j$... with previously found $c_i$ and $c_j$ and with $c_k=1$. Reject the arrangement if the result is not approximately monotonic, e.g. reject if the 'total rises'/'total falls' lies within the range 0.1 to 10. If the arrangement satisfies the approximate monotonicity constraint then do a full non-linear least squares evaluation.

Another way to eliminate alternatives is to use permutations of unit functionals instead of combinations for some or all of the unit functionals. This can lead to a very fast computer algorithm that gets faster rather than slower as the depth of nesting increases. It is a valid approach if all the subtheories that are modelled as nests of functionals, such as Theories A, B and C of Example 1 and Example 2, use permutations of unit functionals.

The invention claimed is:

1. A method of monitoring an evolving system, the method including the steps of:
    obtaining a plurality of sensor data streams relating to outputs from sensors monitoring said system, wherein at least one of said sensors monitors a condition of said system, and wherein at least one of said sensors monitors a causal agent for said condition;
    providing a basic set of functionals, each functional having either two sensor data streams or one sensor data stream and a coefficient; constructing a plurality of functional nests, each functional nest being a different permutation of the basic set of functionals;
    determining an output data stream for each functional nest by inputting said sensor data streams into said functional nests;
    selecting a functional nest from said plurality of functional nests based on said output data streams by combined process of discrete optimization over the plurality of functional nests optimizing the coefficients of the functionals; and
    using said selected functional nest to monitor said system, the method further including the steps of:
        obtaining a data stream relating to the condition of said system;
        selecting as said selected functional nest, a functional nest that has an output data stream that is a best-fit to said condition data stream; and
        constructing said basic set of functionals by dissecting theories relating to the behaviour of said system.

2. The method of claim 1, wherein a functional nest is constructed from a combination of selected functionals and a combination of selected sensor data streams.

3. The method of claim 1, wherein functionals in said basic set have different types of nonlinearity.

4. The method of claim 1, wherein functionals of said basic set have no more than one coefficient, if operating on one data stream, and wherein functionals of said basic set have no coefficients, if operating on two or more data streams.

5. The method of claim 1, including the steps of:
constructing an optimum set of functional nests;
monitoring for new data values for said sensor data streams;
optimizing coefficients of functional nests in said optimum set using said new data values to form optimized functional nests; and
selecting one of said optimized functional nests from said optimum set as said selected functional nest.

6. The method of claim 5, including the steps of:
monitoring for an update condition for said optimum set; and
when said update condition occurs, reconstructing said optimum set by searching for optimum combinations of functionals from said set of functionals.

7. The method of claim 1, including the steps of:
providing a set of functional nests from said set of functionals;
combining functional nests from said set of functional nests with further functionals to provide further functional nests;
forming an updated set of functional nests from said set of functional nests and said further functional nests;
ordering said functional nests in said updated set according to a best-fit condition;
reducing said number of functional nests in said updated set to below a maximum number by discarding functional nests that provide worst fits and by retaining functional nests that provide best fits;
repeating said combining, forming, ordering, and reducing steps until a stop condition is reached; and
selecting said selected functional nest from said updated set of functional nests.

8. The method of claim 1, wherein said functional nests are constructed in accordance with one or more rules, including one or more of:
a limitation based on duplications in functional combinations; a limitation based on system behaviour of a nest, e.g. inappropriate system behaviour; a limitation based on numerical behaviour of a nest; a limitation on permutation of functionals rather than combination.

9. The method of claim 1, wherein functional nests that provide an output data stream that does not conform to an expected characteristic of said monitored system are rejected.

10. The method of claim 1, including the step of using said selected functional nest to provide diagnostics information regarding said system state.

11. The method of claim 1, including the step of using said selected functional nest to provide prognostic information regarding said system state.

12. The method of claim 11, wherein said prognostics information is provided by predicting the outputs from at least one of the sensors to provide predicted data streams, and inputting said predicted data streams into said selected functional nest.

13. The method of claim 12, wherein said predicted data streams are based on prior sensed data streams.

14. The method of claim 1, wherein said system is a first system, and wherein functional nest data of said first system is compared to functional nest data of a second system, and wherein, when said functional nest data of said two systems correlate, functional nest data of said second system is used in determining a selected functional nest for said first system.

15. The method of claim 14, wherein it is determined whether said second system is in a more advanced state than said first system, and, if so, functional nest data of said second system is used in determining a selected functional nest of said first system.

16. The method of claim 1, wherein said system includes a number of sensed and unsensed sub-systems, and wherein unsensed systems are monitored by using selected functional nests and sensor data streams from sensed sub-systems.

17. The method of claim 16, wherein selected functional nests and/or sensor data streams are modified by an extrapolation functional to compensate for differences in sensed and unsensed sub-systems.

18. The method of claim 16, wherein selected functional nests and/or sensor data streams of two or more sensed sub-systems are combined by an interpolation functional to provide a selected functional nest and/or sensor data streams of an unsensed sub-system.

19. The method of claim 16, wherein a selected functional nest of an unsensed sub-system is taken from a first sensed sub-system, and wherein sensor data streams for said unsensed sub-system are taken from a second sensed sub-system.

20. The method of claim 16, including the step of determining sensed sub-systems having functional nest data that correlate with one another, and using said correlated sub-systems to determine similar sub-systems in said system.

21. The method of claim 1, wherein said system is a location on a structure undergoing degradation.

22. The method of claim 21, wherein degradation at a location is monitored by sensing degradation at said location and by sensing causal agents of said degradation at said location.

23. The method of claim 21, wherein locations having similar functional nest data are considered to degrade similarly.

24. The method of claim 21, wherein an unsensed location on said structure is monitored using a selected functional nest derived for a sensed location considered to degrade similarly to said unsensed location.

25. The method of claim 21, wherein selection of functional nests is carried out using a discrete optimization algorithm suitable for NP-hard (Nondeterministic Polynomial-time hard), problems.

26. Apparatus for monitoring an evolving system including:
a set of sensors for monitoring parameters of said system, one of said sensors monitoring a condition of said system, and one of said sensors monitoring a causal agent for said condition; and
a processor configured to:
receive data streams from said set of sensors;
generate a basic set of functionals, each functional having either two sensor data streams or one sensor data stream and a coefficient;
construct a plurality of functional nests, each functional nest being a different permutation of the basic set of functionals;
apply said functional nests to said data streams to produce an output data stream for each functional nest;

select a functional nest based on said output data streams by the combined process of discrete optimization over the plurality of functional nests and optimizing the coefficients of the functionals; and monitor said system using said selected functional nest, wherein the processor is further configured to:

select as said selected functional nest, a functional nest that has an output data stream that is a best fit to a data stream from the sensor monitoring the condition of the system; and construct said basic set of functionals by dissecting theories relating to the behaviour of said system.

27. The apparatus of claim 26, wherein said sensors are provided together in a sensor cluster at a particular location in said system.

28. The apparatus of claim 27, wherein a plurality of locations are monitored, each location having a sensor cluster provided thereat.

29. The apparatus of claim 28, wherein functional nest data of said locations are compared with one another in order to determine whether behaviour of said system at said locations is similar.

30. The apparatus of claim 27, wherein locations in said system that are not provided with sensors are monitored by using functional nest data and sensor data streams from sensed locations.

31. At least one non-transitory computer readable medium comprising computer readable instructions that control at least one processor programmed to implement a method of monitoring an evolving system, the system including a set of sensors for monitoring parameters of said system, one of said sensors monitoring a condition of said system and one of said sensors monitoring a causal agent for said condition, said method comprising:

receiving data streams from said set of sensors;

generating a basic set of functionals, each functional having either two sensor data streams or one sensor data stream and a coefficient;

constructing a plurality of functional nests, each functional nest being a different combination of the basic set of functionals;

applying said functional nests to said data streams to produce an output data stream for each functional nest;

selecting a functional nest based upon said output data streams by the combined process of discrete optimization over the plurality of functional nests and optimizing the coefficients of the functionals; and monitoring said system using said selected functional nest, wherein the at least one processor is programmed to:

select as said selected functional nest, a functional nest that has an output data stream that is a best fit to a data stream from the sensor monitoring the condition of the system; and construct said basic set of functionals by dissecting theories relating to the behaviour of said system.

\* \* \* \* \*